United States Patent Office 3,135,591
Patented June 2, 1964

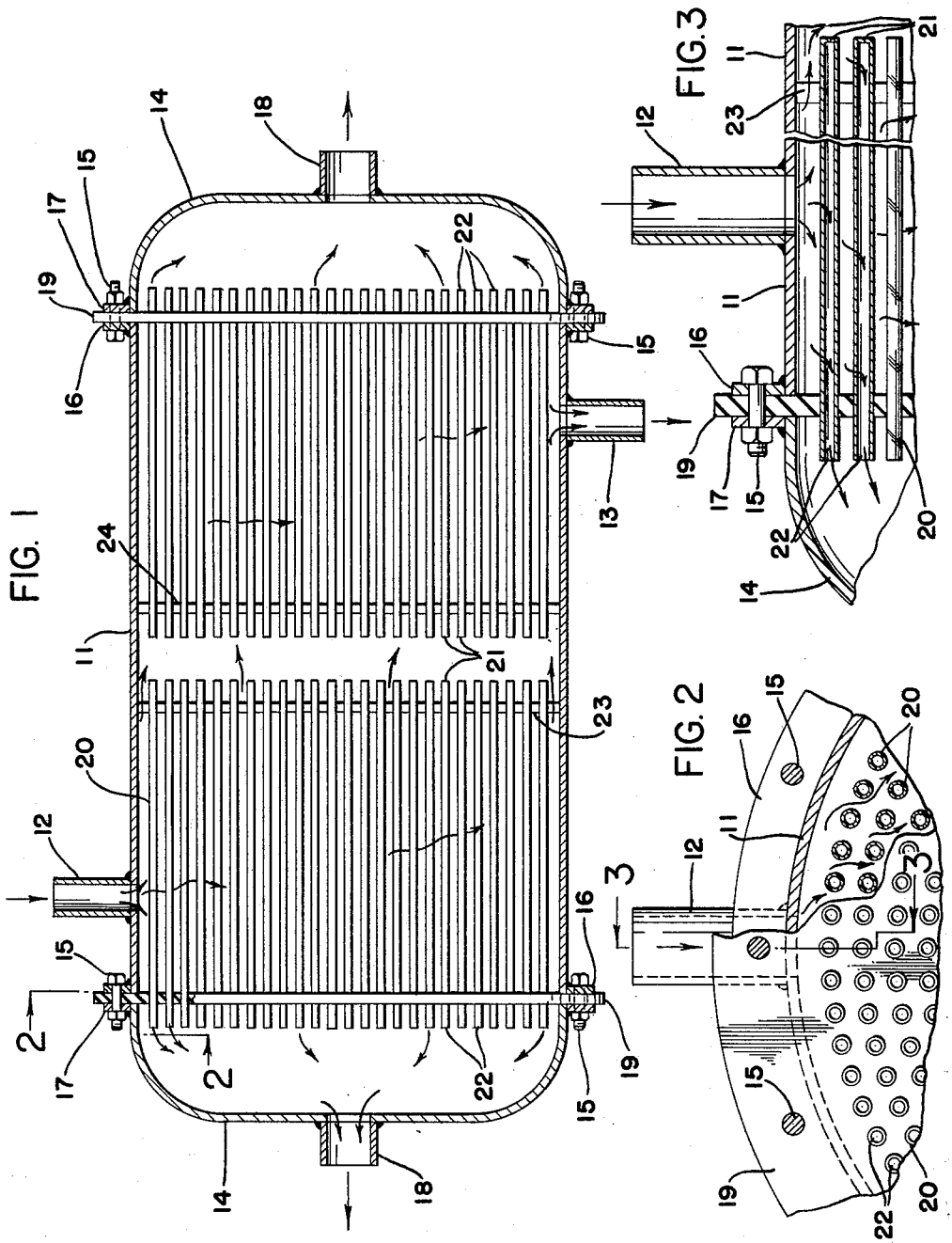

3,135,591
SEPARATION OF HELIUM FROM A GASEOUS MIXTURE BY MEANS OF A NOVEL SELECTIVE DIFFUSION BARRIER
Arthur Letcher Jones, Lyndhurst, Ohio, assignor to The Standard Oil Company, Cleveland, Ohio, a corporation of Ohio
Filed Sept. 8, 1960, Ser. No. 54,647
7 Claims. (Cl. 55—16)

This invention relates to a method and apparatus for continuously separating helium from a gaseous mixture containing the same by means of a novel selective diffusion barrier and to a method of preparing said barrier.

The demand for helium is in excess of supply. Furthermore, the future demand for this material is expected to expand rapidly due to the growth of known uses, coupled with the development of new applications. Helium is found in nature in gas deposits, such as natural gas, and hence to recover this material in pure form it is necessary to separate it from other gases in admixture with it. Presently there is but one commercial process for the separation of helium; namely, low temperature fractionation. Since helium is normally found in gaseous mixtures in very low concentrations, such a separation process requires that a tremendous quantity of gas be cooled to temperatures so low that all the gas except helium is liquefied. This requires a plant of large capital investment involving complicated and expensive equipment.

Obviously, in view of these circumstances, there has been extensive investigations for new processes which can improve the economics of separating helium from a gaseous mixture containing the same.

One prior art method that has been proposed for separating helium from gaseous mixture involves the use of glass capillaries which are preferentially permeable to the helium present in the gaseous mixture so that the helium-containing gas is brought into contact with one side of the glass walls of these capillaries. The walls, acting as diffusion barriers, allow the passage of helium to the other side while impeding the passage of the other gaseous components. These glass capillaries have certain limitations as a diffusion barrier, however, so as to adversely affect the over-all efficiency of this diffusion process.

One of the chief limitations is that the walls of these capillaries cannot be made thin enough to take best advantage of the physical laws governing such a process which provides that the rate of diffusion for any diffusion medium is inversely proportional to the thickness of the wall of such a medium. Obviously, the capillaries formed for use in this process must be maintained of sufficient wall thickness to have adequate mechanical strength so that they may be readily fabricated into units of suitable size for commercial adaptation and rugged enough to sustain prolonged operation. Still another limitation involves the inability or economic impracticality to form such capillaries of materials which might offer the optimum performance with respect to diffusion rate. The diffusion rate of helium through silica is known to be far superior to that for common silica glass, but capillaries in the number required for practical commercial size units prepared of pure silica would be economically prohibitive.

The present invention overcomes these limitations and offers an improved diffusion process for the continuous separation of helium by means of a novel diffusion barrier. The structure comprising the diffusion barrier hereover involves a very thin and uniform layer of substantially pure silica deposited on one side of a glass support which is mechanically strong yet porous to gaseous flow. The actual diffusion medium of this structure therefore is the very thin wall of pure silica which permits the diffusion rate of helium to attain optimum efficiency, without a sacrifice in the overall wall thickness of the structure or the mechanical strength thereof.

Briefly stated, the structure employed as the diffusion barrier hereover is prepared by depositing a very thin layer of substantially pure silica on one side of a wall of a glass substratum which has been heat treated or which may be heat treated subsequent to the deposition of the silica to cause the glass composition of the substratum to separate throughout its mass into two separate phases, one of which is soluble and the other insoluble. The glass substratum is then treated to dissolve out the soluble phase while leaving the other phase undissolved so as to provide a porous physical support for the layer of dissolved silica which will permit the free passage of the helium bearing gases therethrough.

The glass substratum for the diffusion barrier hereof is prepared from a glass composition which falls within a limited region of the ternary system—alkali metal oxide, boric oxide, silica oxide—which will on proper heat treatment separate into two phases. The selected glass may be melted in the usual way to produce a homogeneous melt and it is then shaped into sheets, tubes, or any other suitable shape which will lend itself to use in an apparatus as a diffusion barrier.

The glass substratum may be heat treated to cause phase separation before or after silica deposition, although I find it preferable to carry out this step prior to the depositing of silica. The extent of heat treatment depends upon the particular glass composition chosen, as well as the wall thickness of the structure and the rate at which the original structure cooled during its fabrication. Generally for thin wall structures such as contemplated for use herein, a heat treatment at approximately 525° C. for a few days is suitable. When phase separation has occurred due to the heat treatment, the glass takes on a characteristic bluish opalescence. A more detailed disclosure of glass compositions of the type which will be suitable for the support hereof, as well as a description for separating such compositions into two phases by heat treatment and dissolving out the soluble phase, may be found in U.S. Patent Nos. 2,106,-744 and 2,215,039. This type of glass already heat treated is available in various forms such as in tubing which is preferred for use in the present invention.

The silica layer is deposted on the glass support preferably by vacuum distillation. This method of coating a surface with quartz and apparatus therefor is fully described in U.S. Patent Nos. 2,386,876 and 2,432,538 to Ogle and U.S. Patent No. 2,479,540 to Osterberg. Such a vacuum method involves conditions which permit pure silica to be evaporated from a small mass of finely ground quartz or an intimate mixture of ground quartz with a heat absorbing material such as powdered carbon so that the silica is condensed as a thin, uniform film on the surface of the glass support. The layer of silica deposited in this manner on the glass substratum may be controlled so as to have an average thickness of between approximately $1 \times 10^{-7}$ cm. to about $5 \times 10^{-7}$ cm.

Before depositing silica by such a means, some preliminary conditioning of the glass support is desirable to insure that a strongly adherent coating is obtained although such conditioning is not to be considered as essential to my process. For example, it is desirable to wash the glass support with a detergent solution to remove any film of dirt that might be present, followed by thorough rinsing and controlled vacuum drying to prevent any recontamination of the surface. Good adhesion of the silica layer is especially promoted by exposing the glass support to a glow discharge or prolonged heating at approximately 200 to 220° C. before the vacuum deposition step.

Since the soluble phase of the separated glass substratum is very rich in boric oxide and alkali, the preferred means for dissolving out this phase from the glass substratum to make it porous to gases is by acid leaching. I prefer to carry this out as the final step in preparing the diffusion barrier hereof but it is to be understood that this leaching step could be executed immediately after heat treatment of the glass substratum and prior to silica deposition if so desired.

Aqueous solutions of hydrochloric acid or sulphuric acid are particularly preferred as leaching agents. The concentration of the acid is preferably about three normal hydrochloric acid or a solution having a hydrogen ion concentration equivalent thereto, and the contacting is preferably carried out at slightly elevated temperatures up to approximately 98° C. at atmospheric pressure. The time of acid treatment will vary with the particular glass composition selected as well as the wall thickness of the glass substratum. It has been found that as a general rule the time of leaching at 98° C. will approximate one day for each millimeter of glass thickness although a longer treatment apparently does no harm. For purposes of the invention, it is not essential to completely dissolve out the soluble phase but it is desired to dissolve an amount thereof which will permit the gases to pass freely therethrough.

The following working example represents the best mode of operation contemplated as a method of preparing the selective diffusion barrier hereof.

For the glass support a glass tube was selected having a weight composition of 75% $SiO_2$, 5% $Na_2O$ and 20% $B_2O_3$ and having an outside diameter of 1 cm., a length of 30 cm., and a wall thickness of 0.2 cm. This glass tube was subjected to a heat treatment of 525° C. for 48 hours causing the glass to take on a bluish opalescence due to the separation of phases. After cooling, the tube was placed in a vacuum distillation apparatus of the type disclosed in Patent No. 2,479,540 to Osterberg so that the tube might be surface coated with a thin layer of silica. Within the vacuum chamber a mixture of finely ground quartz and powdered carbon was placed in a tantalum trough disposed in the lower regions of the electrically heated vacuum chamber. A tungsten coil was located just above the surface of the quartz-carbon mixture to supplement the heat input thereto during the evaporation process.

The tubing was placed 12 inches above the surface of the coating material in the tantalum trough and parallel thereto to insure uniform material transfer. The tubing was supported on ball bearing yokes to permit rotation and translation of the tubing as the evaporation proceeded. The driving force for the movement of the tubing was supplied by a close-coupled, small electric motor situated in a vacuum-tight housing within the vacuum chamber. Using this arrangement, the tubing was rotated at a rate of 2 r.p.m. for a period of 3 minutes with evaporation of the silica proceeding under the conditions of from 1500 to 2000° C. as measured by an optical pyrometer and a pressure of $10^{-5}$ mm. of mercury whereby a layer of silica was deposited on the tubing having an average thickness of from $1 \times 10^{-7}$ cm. to $2 \times 10^{-7}$ cm. The thickness of the layer of silica was determined indirectly since straightforward measurements appeared less reliable. To accomplish this, a flat test piece previously plated with aluminum was placed in the vacuum chamber at the same distance from the evaporating trough and under identical conditions of operation for a length of time adjusted to compensate for the movement and curvature of the tubing. The thickness of silica coating on the flat test piece was then determined by optical interference methods. This measurement can be made with good precision and the value obtained may be used as an accurate estimation of the silica coating condensed on the glass substratum.

After the deposition of the silica layer on the exterior of the tubing, the tubing was immersed in a 3 normal solution of hydrochloric acid maintained at a temperature of 98° C. for a time of 5 hours to dissolve out the soluble phase of the glass substratum. The tubing was then removed from the acid bath and thoroughly washed to remove all of the leaching agent and dried. The tubing upon inspection was found to have a uniform, continuous layer of silica. The silica-coated tubing retained its original shape and much of its original strength characteristics.

The selective diffusion barrier structure as described hereinabove is readily adaptable to a process for the continuous separation of helium from a gaseous mixture containing the same. This process may be carried out in a noncyclic manner which involves merely bringing the gaseous mixture containing helium into contact with one side of the selective diffusion barrier hereof, allowing the helium to permeate through the diffusion barrier and removing the helium from the other side of said diffusion barrier.

The diffusion barrier may be formed into any shape without departing from the inventive concept, and the actual shape selected will depend primarily upon the apparatus arrangement in which it is housed. In turn, the form of such apparatus embodiments will be dependent upon the particular nature and location of the installation where helium is to be separated from a gaseous mixture such as in gas transmission lines or at well heads, storage depots, etc.

One apparatus embodiment suitable to provide rapid separation of commercially important volumes of helium from gaseous mixtures bearing the same, such as natural gas, involves the combination of a multiplicity of individual selective diffusion barrier tubes of the type prepared in the above working example in tube sheets which are mounted in a cylindrically shaped shell. This apparatus embodiment is schematically illustrated in the appended drawings in which FIGURE 1 is an elevational view of such apparatus partially in section;

FIGURE 2 is a fragmentary end view partially in section along line 2—2 of FIGURE 1; and FIGURE 3 is a fragmentary elevational view taken along line 3—3 of FIGURE 2 representing an enlargement of a portion of FIGURE 1.

Referring now more specifically to FIGURE 1, this apparatus includes a cylindrical shell 11 having an inlet opening 12 and an outlet opening 13. Helium-containing headers 14 are connected to either end of shell 11 by means of a series of bolt and nut combinations 15 passing through annular flanges 16 provided at the ends of shell 11 and annular flanges 17 provided on headers 14. Headers 14 have outlet openings 18 from which helium is removed by a pumping system not shown on the drawings. The interior of shell 11 is closed from communication from the interior of headers 14 by tube sheets 19 which are supported in a vertical position between flanges 16 and 17. Mounted in tube sheets 19 are a multiplicity of individual selective diffusion barrier tubes 20 having a very thin layer of silica on the exterior of the tubing. Tubes 20 are set in tube sheets 19 in a closely spaced arrangement more clearly shown in FIGURE 2 and, as shown in FIGURES 1 and 3, have a closed end 21 extending into shell 11 and an open end 22 extending into headers 14. It will be clear that the joints of tubes 20 with tube sheet 19 must be tightly sealed so that the interior of headers 14 remain closed from the interior of shell 11. Frames 23 and 24 are provided within shell 11 to support tubes 20 within shell 11.

The method of operation of this apparatus is described below for the separation of helium from natural gas containing the same, although it is to be understood that such method is operable for the separation of helium from any helium-bearing gas.

Natural gas containing helium is introduced into shell 11 through opening 12 under elevated temperature and pressure. The helium contained in the gaseous mixture diffuses into the interior of tubes 20 and is continuously removed by an evacuation system in communication with headers 14. This continuous removal of helium causes the effective pressure within tubes 20 to be maintained at essentially zero favoring the diffusion rate since the driving force in the diffusion process is the difference of the partial pressure of helium between the exterior and interior of tubes 20. The residual gases which do not permeate into the interior of tubes 20 leave shell 11 through opening 13.

The diffusion rate of helium is favored by operation at elevated temperatures and pressures in a manner well known to the art. The rate of flow of gases through an apparatus of the type described and the amount of helium which can be separated therefrom may then be readily determined for any set of temperature and pressure conditions knowing the concentration of helium in the gaseous stream, the total area of diffusion surface provided by the tubes, and the thickness of the silica layer on the tubes. Depending upon what volume of helium it may be desired to recover, one unit of the type described hereinabove or several such units operating in parallel may be desirable for a commercial helium separation facility.

It is to be understood that various modifications of the present invention will suggest themselves to those skilled in the art upon reading the foregoing description. It is intended that all such modifications be included as are reasonably defined by the appended claims.

I claim:
1. A method for preparing a structure which may be used as a selective diffusion barrier for helium comprising the steps of depositing a uniform layer of substantially pure silica having an average thickness of from about $1 \times 10^{-7}$ cm. to $5 \times 10^{-7}$ cm. on a glass substratum which is separated substantially throughout its mass into a soluble phase and an insoluble phase, dissolving out the soluble phase from said glass substratum while leaving the other phase undissolved to provide a physical support for the layer of deposited silica.

2. A method for preparing a structure which may be used as a selective diffusion barrier for helium comprising the steps of depositing a uniform layer of substantially pure silica having an average thickness of from about $1 \times 10^{-7}$ cm. to $5 \times 10^{-7}$ cm. on the exterior wall of a glass tubing which is separated substantially throughout its mass into a soluble phase and an insoluble phase, and contacting the interior of said glass tubing with acid to dissolve out the soluble phase from said glass tubing while leaving the other phase undissolved to provide a physical support for the layer of deposited silica.

3. A structure which is a selective diffusion barrier for separating helium from a gaseous mixture containing the same consisting essentially of a borosilicate glass wall porous to gaseous flow which contains on one side thereof a uniform layer of substantially pure silica having an average thickness of approximately $1 \times 10^{-7}$ cm. to $5 \times 10^{-7}$ cm.

4. A method for separating helium from a gaseous mixture containing the same comprising bringing said gaseous mixture into contact with one side of a selective diffusion barrier consisting essentially of a porous glass substratum on which is deposited a very thin layer of substantially pure silica having an average thickness of approximately $1 \times 10^{-7}$ cm. to $5 \times 10^{-7}$ cm. whereby the helium permeates through said selective diffusion barrier, and removing the permeated helium from the opposite side of said selective diffusion barrier.

5. A method for separating helium from a gaseous mixture containing the same comprising bringing said gaseous mixture maintained under an elevated temperature and pressure into contact with one side of a selective diffusion structure consisting essentially of a porous glass substratum on which is deposited a very thin layer of substantially pure silica having an average thickness of approximately $1 \times 10^{-7}$ cm. to $5 \times 10^{-7}$ cm., maintaining the opposite side of said selective diffusion structure under a pressure lower than the pressure on said first-mentioned side, allowing the helium to permeate through said selective diffusion barrier from the higher to the lower pressure side thereof, and removing the permeated helium from the said lower pressure side of said selective diffusion barrier.

6. A method for separating helium from a gaseous mixture containing the same comprising introducing said gaseous mixture into a chamber containing a plurality of small tubular diffusion barriers consisting essentially of a glass substratum porous to gaseous flow on which is deposited a very thin layer of substantially pure silica having an average thickness of approximately $1 \times 10^{-7}$ cm. to $5 \times 10^{-7}$ cm., said tubular barriers being closed from communication with said chamber and in communication with a common gas collecting header outside of said chamber, allowing the helium to permeate through said tubular diffusion barriers into said common gas collecting header, removing the permeated helium from said header and removing the residual gases which have not permeated the tubular diffusion barriers from said chamber.

7. A method for separating helium from a gaseous mixture containing the same comprising introducing said gaseous mixture at an elevated temperature and pressure into a closed chamber containing a plurality of small tubular diffusion barriers consisting essentially of a glass substratum porous to gaseous flow on which is deposited a very thin layer of substantially pure silica having an average thickness of approximately $1 \times 10^{-7}$ cm., to $5 \times 10^{-7}$ cm., said tubular barriers being closed at one end and sealed into a common gas collecting header at the other end so as to be closed from communication with said chamber, maintaining the interior of said tubular barriers and said gas collecting header under a pressure lower than the pressure inside said chamber on the exterior side of said tubular barriers, allowing the helium to permeate to the exterior of said tubular diffusion barriers, removing the permeated helium from said header and removing from said chamber the residual gases which have not permeated into the interior of said tubular diffusion barriers.

References Cited in the file of this patent

UNITED STATES PATENTS

| | | |
|---|---|---|
| 2,106,744 | Hood et al. | Feb. 1, 1938 |
| 2,479,540 | Osterberg | Aug. 16, 1949 |
| 2,617,153 | Robillard et al. | Nov. 11, 1952 |
| 2,707,899 | Nicoll | May 10, 1955 |
| 2,961,062 | Hunter et al. | Nov. 22, 1960 |
| 3,019,853 | Kohman et al. | Feb. 6, 1962 |
| 3,022,858 | Tillyer et al. | Feb. 27, 1962 |

OTHER REFERENCES

"Helium Separation and Purification by Diffusion," Bell Laboratories Record, vol. 38, No. 7, July 1958, pages 262–263.